(12) United States Patent
Pierce (10) Patent No.: US 10,863,868 B1
(45) Date of Patent: Dec. 15, 2020

(54) MODULAR CONTAINER HOLDER

(71) Applicant: Carrick J. Pierce, New York, NY (US)

(72) Inventor: Carrick J. Pierce, New York, NY (US)

(*) Notice: Subject to any disclaimer, the term of this patent is extended or adjusted under 35 U.S.C. 154(b) by 0 days.

(21) Appl. No.: 16/421,830

(22) Filed: May 24, 2019

(51) Int. Cl.
*A47J 47/16* (2006.01)
*A47F 5/00* (2006.01)
*A47F 7/28* (2006.01)

(52) U.S. Cl.
CPC ............ *A47J 47/16* (2013.01); *A47F 5/0037* (2013.01); *A47F 7/283* (2013.01)

(58) Field of Classification Search
CPC ......... A47J 47/16; A47F 5/0037; A47F 7/283; A47F 7/28; A47G 23/0216; A47G 29/08; A47B 81/00; A47B 73/008; A47B 87/007; A47B 43/00; A47B 73/00
USPC ... 211/75, 85.17, 85.18–85.23, 85.26, 88.01, 211/88.03, 126.14
See application file for complete search history.

(56) References Cited

U.S. PATENT DOCUMENTS

| | | | |
|---|---|---|---|
| 1,378,902 A | 5/1921 | Roehl | |
| 1,738,821 A * | 12/1929 | Gibson | A47B 71/00 211/88.01 |
| 1,894,185 A * | 1/1933 | Martin | A47B 96/00 211/88.01 |
| 2,982,423 A * | 5/1961 | Handler | A47F 5/0025 211/126.1 |
| 3,581,906 A * | 6/1971 | Joyce | A47B 87/02 211/126.5 |
| 4,064,992 A | 12/1977 | Ralston et al. | |
| 4,131,203 A * | 12/1978 | Bridges | A47F 5/0025 108/32 |
| 4,160,570 A * | 7/1979 | Bridges | A47F 3/00 312/245 |
| 4,378,889 A | 4/1983 | Lebowitz | |
| 4,955,488 A * | 9/1990 | Nicoll | A47B 47/06 211/128.1 |
| 5,024,337 A * | 6/1991 | Bailey | A47F 5/0807 211/88.01 |
| 5,390,801 A * | 2/1995 | Hansen | A47F 7/147 211/126.13 |
| D402,512 S | 12/1998 | Lee et al. | |
| 5,855,282 A * | 1/1999 | Hardy | A47F 5/0823 211/106 |
| 6,092,672 A * | 7/2000 | Harris | B42F 7/12 211/11 |
| 6,808,149 B1 | 10/2004 | Sendowski et al. | |
| D509,691 S | 9/2005 | Doran | |
| 7,527,158 B2 * | 5/2009 | Gainer | A47B 17/036 211/113 |
| 7,562,853 B2 | 7/2009 | Mazzola | |

(Continued)

*Primary Examiner* — Ko H Chan
(74) *Attorney, Agent, or Firm* — Goldstein Law Offices, P.C.

(57) ABSTRACT

A modular container holder comprising a backing panel and a basket portion, the backing panel has a magnetic mounting means adapted to detachably secure the modular container holder to a vertical mounting surface, the basket portion projects forwardly from the backing panel and is adapted to receive and retain a container. A contiguous modular arrangement of multiple modular containers positioned in column or row configurations allows multiple containers to be stored, while the basket portion is tilted forwardly to prevent the obstruction of basket openings when the modular container holders are vertically stacked in the column configuration.

20 Claims, 5 Drawing Sheets

(56) References Cited

U.S. PATENT DOCUMENTS

| | | |
|---|---|---|
| 8,439,209 B2 | 5/2013 | Strollo |
| 9,282,842 B1 * | 3/2016 | Brooks |
| 10,631,634 B1 * | 4/2020 | Pierce ................. A47G 23/0216 |
| 10,716,396 B1 * | 7/2020 | Pierce ..................... A47G 29/08 |
| 2003/0038100 A1 * | 2/2003 | Liu ........................... B25H 3/04 |
| | | 211/88.01 |
| 2014/0360955 A1 | 12/2014 | Presenty |

* cited by examiner

MODULAR CONTAINER HOLDER

TECHNICAL FIELD

The present disclosure relates generally to a repositionable holder for storing containers. More particularly, the present disclosure relates to a modular container holder which is detachably secured to a mounting surface.

BACKGROUND

Racks and shelves are often used to store and organize containers. However, conventional racks and shelves are fixed in size and shape and cannot be reconfigured or expanded to suit specific storage and organizational needs, causing inefficient use of space. For example, containers holding different spices are stored on a spice rack. The spice rack cannot be reconfigured to increase or decrease the number of spaces for containers, in response to changing storage needs.

As a result, the prior art contains many examples of reconfigurable storage and mounting apparatuses, such as movable shelves, and repositionable holders. However, these devices are often tailored towards holding containers with a specific shape and are unsuitable for storing collections of containers with diverse shapes and sizes. The devices within the prior art are also difficult to stack vertically, as holders in the stack are obstructed by the holders positioned above. Furthermore, existing repositionable holders lack any way of ensuring consistent alignment between multiple holders employed simultaneously, resulting in a haphazard or disorganized arrangement.

Therefore, a need exists for a modular container holder capable of being detachably secured to a mounting surface, which is further capable of holding containers of any shape and size, and does not obstruct the insertion or removal of containers when multiple modular container holders are vertically stacked upon the mounting surface.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a holder capable of receiving and storing a container, which is further capable of being detachably secured to a ferrous vertical mounting surface. Accordingly, the present disclosure provides a modular container holder comprising a backing panel and a basket portion, the basket portion is adapted to receive and store the container, while the backing panel has a magnet mounting means adapted to detachably secure a modular container holder upon the vertical mounting surface.

It is another aspect of an example embodiment in the present disclosure to provide a holder capable of being combined with other holders to store a plurality of containers. Accordingly, the present disclosure provides a modular container holder whereby the backing panel has top and lower edges and sides extending therebetween, allowing multiple modular container holders to be contiguously aligned in a column configuration or a row configuration.

It is yet another aspect of an example embodiment in the present disclosure to provide a holder which allows containers to be inserted or removed without obstruction when the modular container holders are positioned in the column configuration. Accordingly, the present disclosure provides a modular container holder whereby the basket portion tilts forwardly away from the backing panel, preventing the obstruction of the basket portion of the modular container holder positioned below another modular container holder in the column configuration.

It is a further aspect of an example embodiment in the present disclosure to provide a holder which is prevented from sliding downwardly upon the vertical mounting surface. Accordingly, the present disclosure provides a modular container holder further comprising a friction element positioned upon the rear face of the backing panel, which is adapted to frictionally engage the vertical mounting surface to prevent the modular container holder from sliding downwardly.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
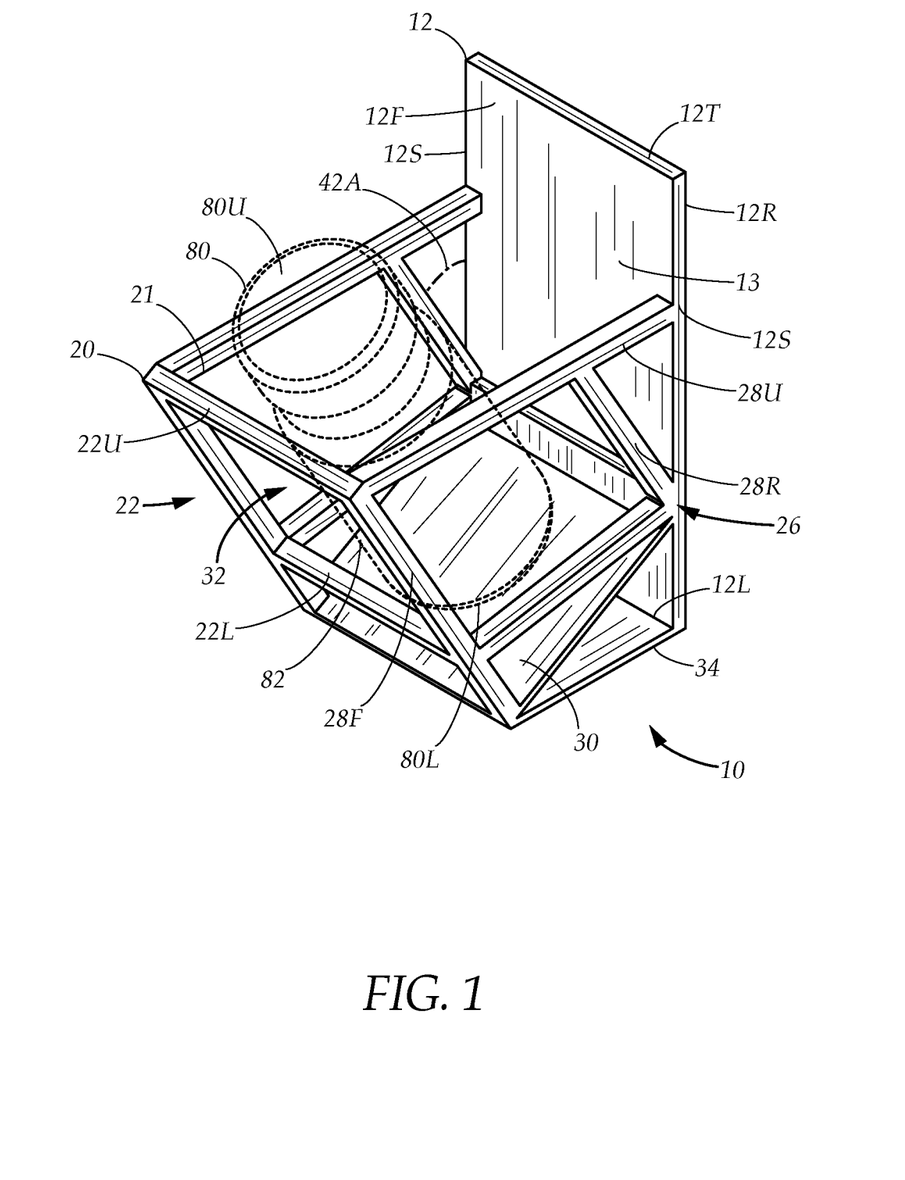
FIG. 1 is a diagrammatical depiction of a modular container holder adapted to retain and support a container, the container holder having a backing panel with a basket portion projecting forwardly therefrom, in accordance with an embodiment in the present disclosure.
Figure 3:
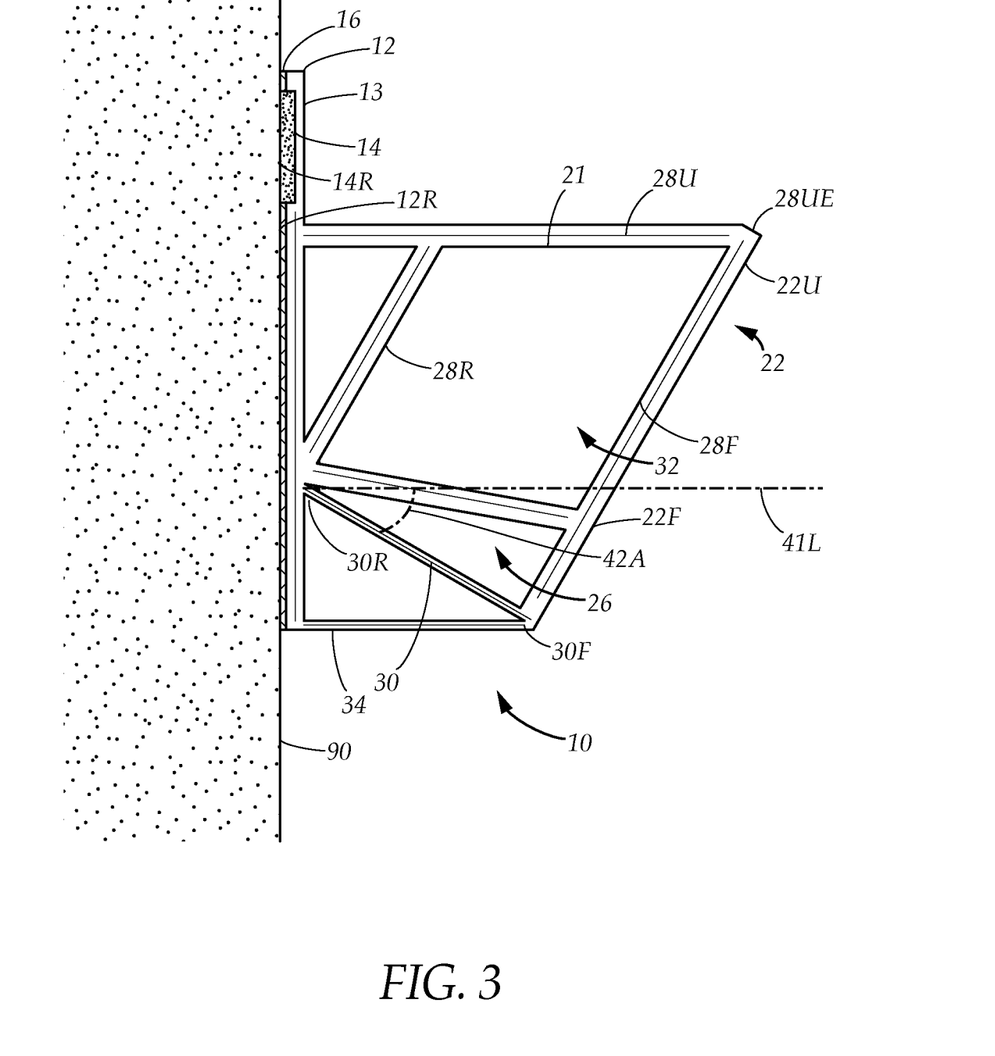
FIG. 3 is a diagrammatical cross section view of the modular container holder viewed from the side, showing the rear panel back face in magnetic contact with a vertical mounting surface, with the frictional layer preventing the modular container holder from sliding downwards, in accordance with an embodiment in the present disclosure.
Figure 4:
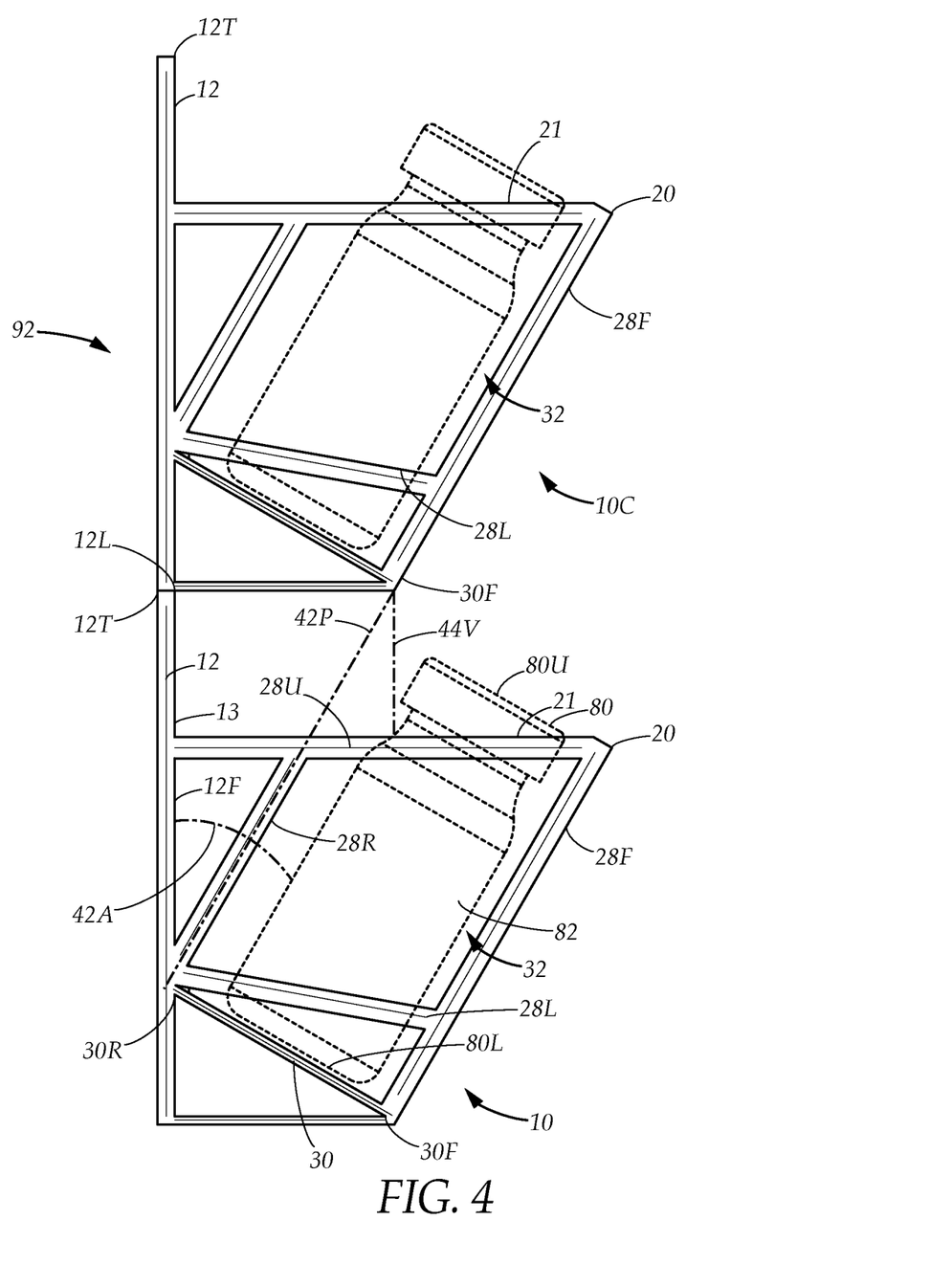
FIG. 4 is a diagrammatical side view of two modular container holders positioned in a column configuration, whereby the basket portion of each of the modular container holders is positioned at a basket tilt angle which allows access to the basket retaining space to remain unobstructed by the basket portion of the modular container holder positioned above, in accordance with an embodiment in the present disclosure.

FIG. 1 illustrates a modular container holder 10 comprising a backing panel 12 and a basket portion 20. The backing panel 12 has a front face 12F, a rear face 12R disposed opposite thereof, a top edge 12T, and a lower edge 12L. The backing panel 12 may further have a pair of sides 12S which extend between the top and lower edges 12T, 12L. The basket portion 20 projects from the front face 12F and tilts forwardly. The basket portion 20 has an upwardly opening basket opening 21 which reveals a basket retaining space 32, which is adapted to receive and retain a container 80. The container 80 may be a bottle, jar, can, vessel, or other storage apparatus adapted to store a variety of contents. The container 80 may have a container upper portion 80U, a container lower portion 80L, and a container body 82 which extend therebetween. Turning briefly to FIGS. 3 and 4, the backing panel 12 is adapted to be detachably secured to a vertical mounting surface 90, allowing the modular container holder 10 to be attached or repositioned to any point upon the vertical mounting surface 90. Furthermore, multiple modular container holders 10 may be combined to form a contiguous modular arrangement 92 upon the vertical mounting surface 90. For example, multiple modular container holders 10 may be employed to hold containers 80 of spices or condiments upon a refrigerator door, thus creating a modular spice rack.

Returning now to FIG. 1, the basket portion 20 further has a basket front 22 and a pair of basket sides 26. The basket sides 26 project forwardly from the front face 12F, while the basket font 22 is located distally from the front face 12F, extending laterally between the basket sides 26. The basket front 22 and the basket sides 26 collectively define the basket retaining space 32 therebetween, and the basket retaining space 32 opens upwardly through the basket opening 21. The basket portion 20 further has a basket base panel 30 located distally from the basket opening 21 towards the backing panel lower edge 12L. The container 80 is placed within the basket retaining space 32 by inserting the container lower portion 80L downwardly through the basket opening 21 until the container lower portion rests upon the base panel 30. The container 80 tilts forwardly within the basket portion 20, such that the container body 82 rests upon the basket front 22. The basket portion 20 is capable of retaining containers 80 of any shape, as long as the container lower portion 80L rests upon the basket base panel 30 and the container 80 is prevented from falling out of the basket retaining space 32 by the basket front 22 and/or basket sides 26.

Figure 2:
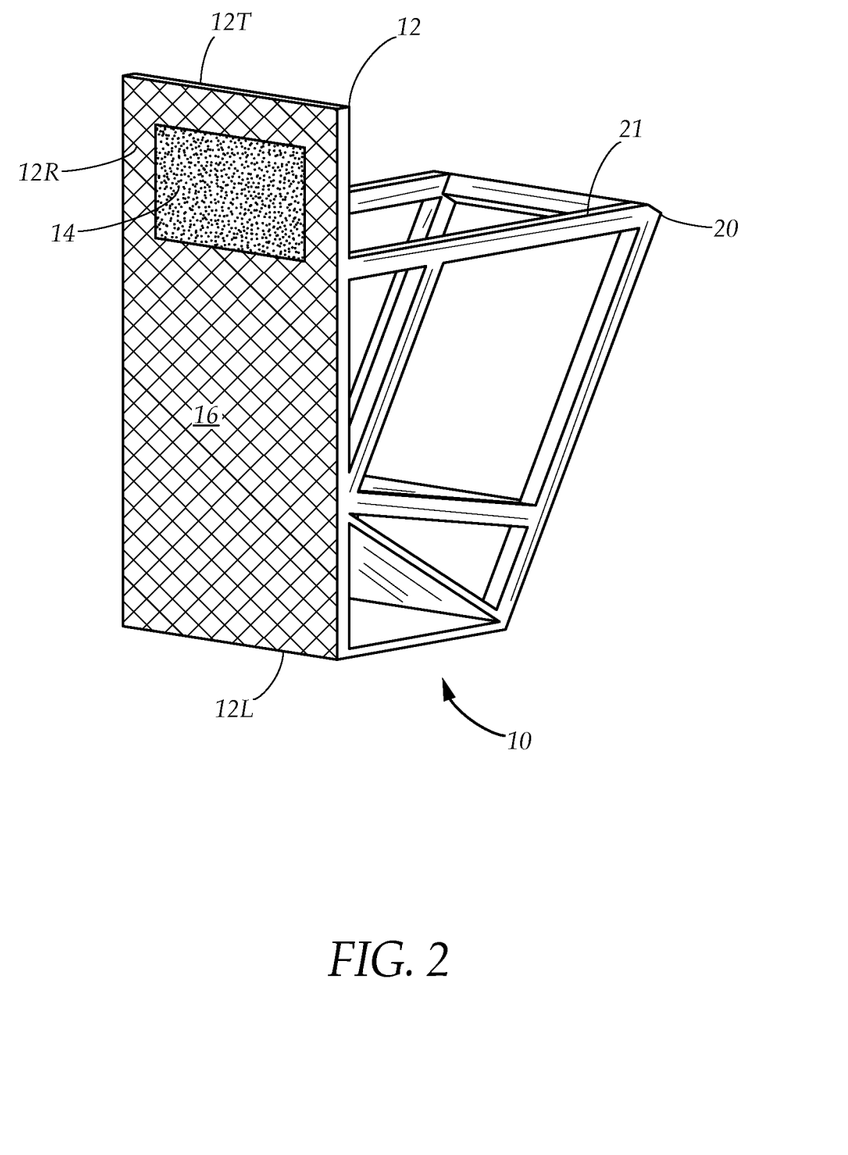
FIG. 2 is a diagrammatical depiction of the modular container holder viewed from the rear, showing the backing panel rear face with a magnet and a friction element, in accordance with an embodiment in the present disclosure.

Turning now to FIG. 2 while also referring to FIG. 3, the rear face 12R of the backing panel 12 is adapted to be attached to the vertical mounting surface 90. In a preferred embodiment, the rear face 12R of the backing panel 12 has a mounting means comprising a magnet 14, and the vertical mounting surface 90 may be a refrigerator door, metal cabinet, or other surface formed using ferrous materials, to which the magnet 14 may detachably adhere. The rear face 12R of the backing panel 12 may also have a magnet retention slot 14R which is adapted to retain the magnet 14 and allow the magnet to 14 remain flush with the rear face 12R. The magnet retention slot 14R and/or the magnet 14 may be positioned proximate to the top edge 12T of the backing panel 12. The rear face 12R of the backing panel may further have a friction element 16 which is adapted to contact and frictionally engage the vertical mounting surface 90 to prevent the modular container holder 10 from being pulled downward by gravity. The friction element 16 may be implemented using rubber, friction tape, or any other similar material which is thin and has high frictional properties. In one embodiment, the friction element 16 may be positioned between the magnet 14 and the lower edge 12L of the backing panel 12. In another embodiment, the friction element 16 may cover the entirety of the rear face 12R with the exception of the magnet 14, such that the friction element 16 surrounds the magnet 14. The magnet 14 may have a thickness which allows the magnet 14 to remain flush with the friction element 16. Note that in alternate embodiments, the mounting means may be a reusable adhesive or other suitable means which allows the modular container holder 10 be detachably secured to the vertical mounting surface 90. In certain embodiments, the mounting means may instead be used to permanently attach the modular container holder to the vertical mounting surface 90.

Continuing to refer to FIG. 3 while also referring to FIG. 1, the basket portion 20 is tilted forwardly at a basket tilt angle 42A. The basket base panel 30 has a base panel rear edge 30R which extends horizontally across the front face 12F of the backing panel 12, and a distally oriented base panel front edge 30F. In a preferred embodiment, the base panel 30 extends away from the front face 12F of the backing panel 12, and is angled downwardly to match the basket tilt angle 42A. The basket sides 26 each have an upper side support 28U which projects away from the front face 12F of the backing panel, and each upper side support 28U has an upper side support end 28UE which terminates distally from the front face 12F of the backing panel 12. The basket front 22 has a pair of front side supports 28F, which extend from the upper side support end 28UE of each basket side 26 to the base panel front edge 30F, thus joining each basket side 26 to the basket base panel 30. To enclose the basket front 22 and retain the container 80 within the basket retaining space 32, the basket front 22 further has a front upper support 22U which extends horizontally between each of the upper side support ends 28UE. The basket opening 21 may therefore be defined by the upper side supports 28U and the front upper support 22U. Furthermore, the basket front 22 may also have a front lower support 22L which extends horizontally between the front side supports 28F at a position between the front upper support 22U and the base panel front edge 30F. The basket sides 26 may each have a lower side support 28L positioned between the upper side support 28U and the basket base panel 30, which extends from the front face 12F of the backing panel 12 to connect with the basket front 22. In certain embodiments, the basket portion 20 may also have a pair of rear side supports 28R which extend between the upper side supports 28U and the lower side supports 28L.

In a preferred embodiment, the basket tilt angle 42A is approximately thirty degrees in relation to a horizontal line 41L drawn perpendicularly in relation to the backing panel 12. The basket base panel 30 therefore projects away from the backing panel 12 at an angle of approximately 30 degrees in relation to the horizontal line 41L, when the horizontal line 41L extends through the base panel rear edge. The front side support 28F is oriented perpendicularly in relation to the basket base panel 30. When the container 80 is retained within the basket retaining space 32, the container lower portion 80L rests upon the basket base panel 30 while the container body 82 is supported by the front upper support 22U and/or the front lower support 22L of the basket front 22, thus ensuring that the container 80 is held at an angle of approximately thirty degrees in relation to the backing panel 12, equal to the basket tilt angle 42A.

Referring to FIG. 4 while also referring to FIGS. 1 and 3, the modular container holder 10 may be combined with a substantially identical second modular container holder 10C to form a contiguous modular arrangement 92 upon the vertical mounting surface 90. For example, the modular container holder may be vertically stacked to form a column configuration, where the modular container holder 10 is positioned below the second modular container holder 10C, with the top edge 12T of the modular container holder 10 in contact with the lower edge 12L of the second modular container holder 100. Alternatively, the modular container holder 10 may be placed alongside the second modular container holder 10C to create a horizontal configuration, whereby one of the sides 12S of the modular container holder 10 is in contact with one of the sides 12S of the second modular container holder 10C. The contiguous modular arrangement 92 of modular container holders 10 allows for efficient and flexible use of the vertical mounting surface 90 to store multiple containers 80. The top and lower edges 12T, 12L and sides 12S of the backing panel 12 ensure that the modular container holders 10 within the contiguous modular arrangement 92 are consistently aligned.

Furthermore, the basket tilt angle 42A ensures that the basket portion 20 of the second modular container holder 10C does not obstruct the insertion or removal of the container 80 through the basket opening 21 of the modular container holder 10 positioned therebelow in the column configuration. The base panel front edge 30F of the second modular container holder 10C is therefore separated from the basket opening 21 of the modular container holder 10 by a vertical distance 44V sufficient to prevent the obstruction of the basket opening 21.

The backing panel 12 may further have a backing panel upper portion 13 which extends between the top edge 12T and the basket portion 20, and has an upper portion height. In certain embodiments, the backing panel upper portion 13 extends between the upper side supports 28U and the top edge 12T of the backing panel 12. The backing panel upper portion 13 has an upper portion height, which ensures sufficient separation between the basket portions 20 of the second modular container holder 10C and the modular container holder 10. In certain embodiments, where the upper side supports 28U extend perpendicularly from the backing panel 12, the upper portion height is equal to the vertical distance 44V.

In certain embodiments, the basket front 22 is perpendicular to the basket base panel 30. When in the column configuration, the basket front 22 of the second modular container holder 100 approaches and may be coplanar with an alignment plane 42P which projects upwardly from the base panel rear edge 30R and is perpendicular with the basket base panel 30. However, the basket front 22 of the second modular container 10C is prevented from extending downwardly past the alignment plane 42P by the backing panel upper portion 13 of the modular container holder 10 positioned therebelow. In embodiments where the basket front 22 is not perpendicular to the basket base panel 30, the backing panel upper portion 13 prevents the base panel front edge 30F from extending downwardly past the alignment plane 42P.

In an example embodiment, the backing panel 12 may measure approximately 12.5 cm from the top edge 12T to the lower edge 12L, while the upper panel portion height is approximately 25 cm. The base panel rear edge 30R is attached to the backing panel 12 at a point approximately 3 cm from the lower edge 12L, while the base panel front edge 30F is separated horizontally from the backing panel 12 by a distance of 6.5 cm. When the basket tilt angle 42A is approximately 30 degrees, the base panel upper portion 13 creates sufficient vertical distance 44V to prevent the basket portion 20 of the second modular container holder 10C from extending downwardly past the alignment plane 42P.

Referring to FIG. 1, note that the basket portion 20 may be formed in alternate configurations in accordance with the principles of the present disclosure. The basket front 22, the basket sides 26, and the basket base panel 30 may alternatively be formed using panels, wireframes, or any other structural element suitable for achieving the purpose of supporting the container 80 within the basket retaining space 32. In certain embodiments, the basket front 22, the basket sides 26, and the basket opening 21 may collectively form a "U" shape when viewed from above.

Referring to FIGS. 1 and 3, in certain embodiments, the modular container holder 10 may further have a lower support 34 which extends from the backing panel lower edge 12L to connect with the base panel front edge 30F, thereby reinforcing and supporting the basket portion 20.

Furthermore, it is noted that the modular container holder 10 may be attached to a surface which is not vertical, so long as the basket opening 21 is properly oriented to ensure the container is retained within the basket retaining space 32.

Figure 5:
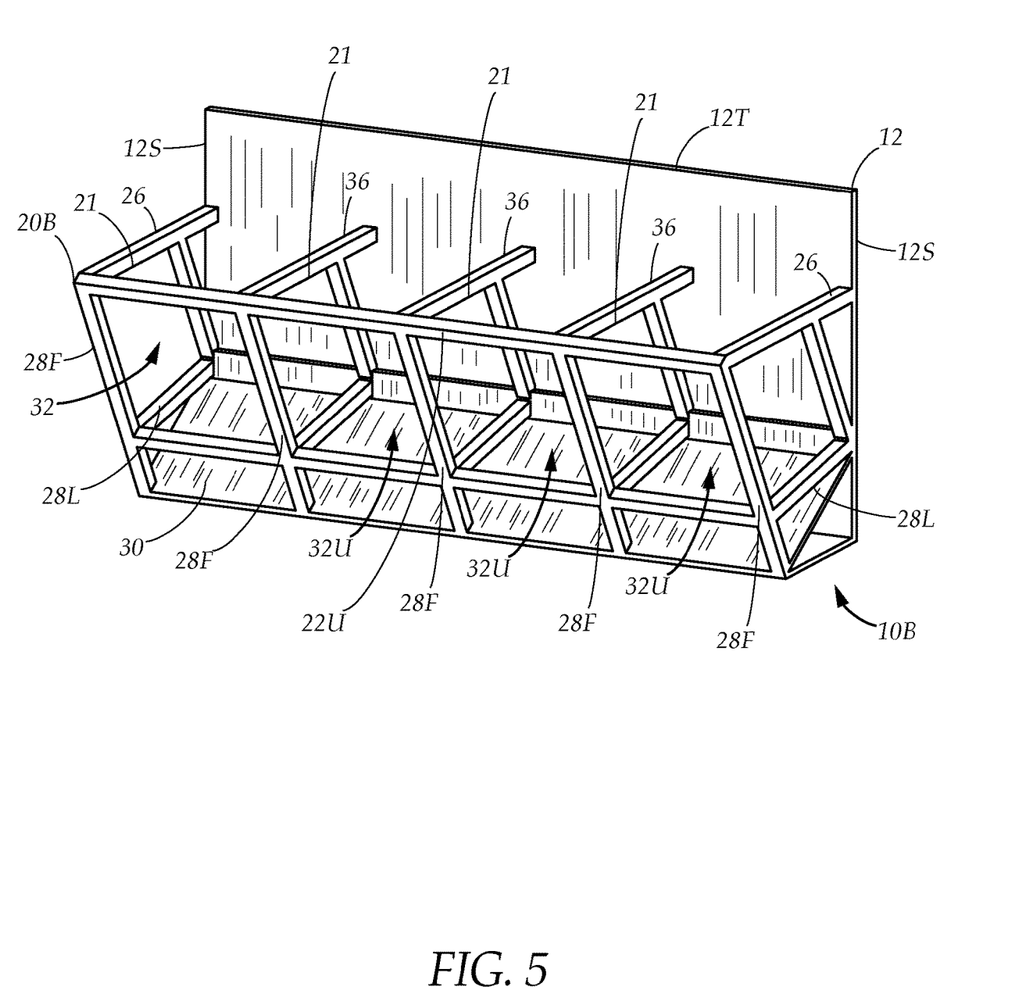
FIG. 5 is a diagrammatical perspective view of an alternate modular container holder adapted to hold multiple containers within a plurality of compartments within the basket portion, in accordance with an embodiment in the present disclosure.

Referring now to FIG. 5, in an alternate embodiment, the modular container holder 10B may have an alternative basket portion 20B which has one or more intermediate dividers 36 positioned between the basket sides 26, which divide the basket retaining space 32 into a plurality of compartments 32U. The alternate basket portion 20B is sufficiently wide to allow each compartment 32U to receive and store containers 80 (as shown in FIG. 1).

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a modular container holder. The disclosure is illustrated by example in the drawing figures, and throughout the written description. It should be understood that numerous variations are possible, while adhering to the inventive concept. Such variations are contemplated as being a part of the present disclosure.

What is claimed is:

1. A modular container holder adapted for holding a container, the container having a container top portion, a container lower portion, and a container body extending therebetween, the modular container holder is further adapted to be detachably secured to a vertical mounting surface, the modular container holder comprising:
   a backing panel having a front face and a rear face disposed opposite thereof, the rear face having a mounting means adapted to detachably secure the backing panel to the vertical mounting surface; and
   a basket portion having a basket front, a pair of basket sides, a basket base panel, and an upwardly opening basket opening disposed opposite the basket base panel, the basket portion further having a basket retaining space which is defined between the basket front, the basket sides, the basket base panel, and the basket opening, the basket base panel having a base panel rear edge in contact with the front face of the backing panel and a front edge oriented away from the backing panel, the basket base panel projecting forwardly away from the backing panel and tilted downwardly at a basket tilt angle in relation to a horizontal line drawn from the base panel rear edge, the basket sides having a pair of upper side supports projecting away from the front face of the backing panel and terminating at upper side support ends, the basket front having a pair of front side supports extending from the pair of upper side support ends to the front edge of the base panel at an acute angle in relation to the upper side support ends, the basket opening adapted to allow the container to be inserted into the basket retaining space to be retained at an angle therein.

2. The modular container holder as described in claim 1, wherein the basket portion is tilted forwardly away from the rear face of the backing panel, and the basket base panel is adapted to support the container lower portion.

3. The modular container holder as described in claim 2, wherein:
   the backing panel further has a top edge, a lower edge distally oriented in relation to the top edge, and a pair of sides extending therebetween; and
   wherein the modular container holder is further adapted to be employed with a second modular container holder substantially identical to the modular container holder, the modular container holder and the second modular container holder are adapted to form a contiguous modular arrangement upon the vertical mounting surface, whereupon the modular container holder and the second modular container holder are adapted to form:
      a column configuration whereby the second modular container holder is attached to the vertical mounting surface above the modular container holder and the top edge of the backing panel of the modular container holder contacts the lower edge of the backing panel of the second modular container holder, or a row configuration where one of the sides of the modular container holder contacts one of the sides of the second modular container holder.

4. The modular container holder as described in claim 3, wherein:
   the basket tilt angle ensures that the basket portion of the second modular container holder does not obstruct the insertion or removal of the container through the basket opening of the modular container holder positioned therebelow.

5. The modular container holder as described in claim 4, wherein:
   the vertical mounting surface is comprised of a ferrous material; and
   the mounting means comprises a magnet.

6. The modular container holder as described in claim 5, wherein:
   the rear face of the backing panel further has a friction element adapted to frictionally engage the vertical mounting surface, the friction element is adapted to prevent the modular container holder from sliding downwardly along the vertical mounting surface.

7. The modular container holder as described in claim 6, wherein:
   the backing panel further has a backing panel upper portion extending between the top edge and the basket portion, the backing panel upper portion having an upper portion height;
   the basket front projects upwardly and perpendicularly away from the base panel front edge; and
   the backing panel upper portion creates a vertical distance between the base panel front edge of the second modular container holder and the basket opening of the modular container holder positioned therebelow in the column configuration, whereby the basket front of the second modular container holder is substantially coplanar with an alignment plane which originates from the base panel rear edge of the modular container holder and projects upwardly and perpendicularly in relation to the basket base panel of the modular container holder, whereby the vertical distance ensures the basket portion of the second modular container holder does not obstruct the basket opening of the modular container holder.

8. The modular container holder as described in claim 7, wherein:
the mounting means is positioned on the rear face of the top edge proximate to the backing panel upper portion; and
the friction element is positioned between the mounting means and the lower edge of the backing panel.

9. The modular container holder as described in claim 8, wherein:
the basket portion further has one or more intermediate dividers positioned between the basket sides, the intermediate dividers extend from the backing panel towards the basket front and divide the basket retaining space into a plurality of compartments, each compartment is adapted to receive and retain the container.

10. A method for storing a container upon a vertical mounting surface, the container having a container top portion, a container lower portion, and a container body extending therebetween, the method comprising the steps of:
providing a modular container holder having:
a backing panel having a front face and a rear face disposed opposite thereof, the rear face having a mounting means adapted to detachably secure the backing panel to the vertical mounting surface; and
a basket portion having a basket front, a pair of basket sides, a basket base panel, and an upwardly opening basket opening disposed opposite the basket base panel, the basket portion further having a basket retaining space which is defined between the basket front, the basket sides, the basket base panel, and the basket opening, the basket base panel having a base panel rear edge in contact with the front face of the backing panel and a front edge oriented away from the backing panel, the basket base panel projecting forwardly away from the backing panel and tilted downwardly at a basket tilt angle in relation to a horizontal line drawn from the base panel rear edge, the basket sides having a pair of upper side supports projecting away from the front face of the backing panel and terminating at upper side support ends, the basket front having a pair of front side supports extending from the pair of upper side support ends to the front edge of the base panel at an acute angle in relation to the upper side support ends;
detachably securing the modular container holder to the vertical mounting surface, placing the rear face of the backing panel and the mounting means of the modular container holder against the vertical mounting surface;
inserting the container lower portion downwardly through the basket opening of the modular container holder until the container lower portion rests upon the basket base panel; and
storing the container within the basket retaining space of the modular container holder.

11. The method as described in claim 10, wherein:
the basket portion is tilted forwardly away from the rear face of the backing panel; and
the step of inserting the container lower portion further comprises tilting the container forwardly within the basket retaining space and resting the container body against the basket front.

12. The method as described in claim 11, wherein:
the backing panel further has a top edge and a distally oriented lower edge;
the step of providing a modular container holder is followed by the step of providing a second modular container holder substantially identical to the modular container holder;
the step of detachably securing the modular container holder to the vertical mounting surface is preceded by the step of detachably securing the second modular container holder to the vertical mounting surface, and placing the rear face of the backing panel and the mounting means of the second modular container holder against the vertical mounting surface; and
the step of detachably securing the modular container holder to the vertical mounting surface further comprises positioning the modular container holder below the second modular container holder, placing the top edge of the backing panel of the modular container holder in contact with the lower edge of the backing panel of the second modular container holder to achieve a column configuration.

13. The method as described in claim 12, wherein:
the rear face of the backing panel further has a friction element adapted to frictionally engage the vertical mounting surface; and
the step of storing the container is followed by the step of:
frictionally engaging the vertical mounting surface using the friction element of the modular container holder, and preventing the modular container holder from sliding downwardly along the vertical mounting surface.

14. The method as described in claim 13, wherein:
the backing panel further has a backing panel upper portion extending between the top edge and the basket portion, the backing panel upper portion having an upper portion height; and
the step of detachably securing the modular container holder to the vertical mounting surface further comprises creating a vertical distance between the base panel front edge of the second modular container holder and the basket opening of the modular container holder positioned therebelow, the vertical distance ensuring the basket portion of the second modular container holder does not obstruct the basket opening of the modular container holder.

15. The method as described in claim 14, wherein:
the basket front projects upwardly and perpendicularly from the base panel front edge; and
the step of detachably securing the modular container holder to the vertical mounting surface is followed by the step of:
aligning the basket front of the second modular container holder with an alignment plane which originates from the base panel rear edge of the modular container holder and projects upwardly and perpendicularly in relation to the basket base panel of the modular container holder.

16. The method as described in claim 12, wherein:
the backing panel further has a pair of sides which extend between the top edge and the lower edge; and
the steps as recited are followed by the step of:
detachably securing the modular container holder to the vertical mounting surface in a row configuration, placing one of the sides of the modular container holder in contact with one of the sides of the second modular container holder.

17. The modular container holder as described in claim 3, further comprising:

a lower support extending from the lower edge of the backing panel to connect with the front edge of the base panel to reinforce and support the basket portion;
wherein:
the pair of upper side supports include a length greater than a length of the lower support such that the pair of upper side supports project further outwardly from the front face of the backing panel than does the lower support, and
the front side supports extends from the lower support to form an obtuse angle in relation to the lower support.

18. The method as described in claim 12, further comprising a lower support extending from the lower edge of the backing panel to connect with the front edge of the base panel to reinforce and support the basket portion;
wherein:
the pair of upper side supports include a length greater than a length of the lower support such that the pair of upper side supports project further outwardly from the front face of the backing panel than does the lower support, and
the front side supports extends from the lower support to form an obtuse angle in relation to the lower support.

19. A modular container holder adapted for holding a container, the container having a container top portion, a container lower portion, and a container body extending therebetween, the modular container holder is further adapted to be detachably secured to a vertical mounting surface, the modular container holder comprising:
a backing panel having a front face, a rear face disposed opposite the front face, a top edge, and a lower edge distally oriented in relation to the top edge, the rear face having a mounting means adapted to detachably secure the backing panel to the vertical mounting surface;
a basket portion tilted forwardly away from the rear face of the backing panel, the basket portion having a basket front, a pair of basket sides, a basket base panel adapted to support the container lower portion, and an upwardly opening basket opening disposed opposite the basket base panel, the basket portion further having a basket retaining space which is defined between the basket front, the basket sides, the basket base panel, and the basket opening, the basket base panel having a base panel rear edge in contact with the front face of the backing panel and a front edge oriented away from the backing panel, the basket base panel projecting forwardly away from the backing panel and tilted downwardly at a basket tilt angle in relation to a horizontal line drawn from the base panel rear edge, the basket opening adapted to allow the container to be inserted into the basket retaining space to be retained at an angle therein;
wherein the backing panel further has a backing panel upper portion extending between the top edge and the basket portion, the backing panel upper portion having an upper portion height; and
wherein the modular container holder is further adapted to be employed with a second modular container holder substantially identical to the modular container holder, the modular container holder and the second modular container holder are adapted to form a contiguous column configuration whereby the second modular container holder is attached to the vertical mounting surface above the modular container holder and the top edge of the backing panel of the modular container holder contacts the lower edge of the backing panel of the second modular container holder, the backing panel upper portion creates a vertical distance between the base panel front edge of the second modular container holder and the basket opening of the modular container holder positioned therebelow in the column configuration, whereby the basket front of the second modular container holder is substantially coplanar with an alignment plane which originates from the base panel rear edge of the modular container holder and projects upwardly and perpendicularly in relation to the basket base panel of the modular container holder, whereby the vertical distance and the basket tilt angle ensure the basket portion of the second modular container holder does not obstruct insertion or removal of the container through the basket opening of the modular container holder.

20. The modular container holder as described in claim 1, wherein:
the basket sides have a pair of upper side supports projecting away from the front face of the backing panel below the top edge of the backing panel and terminating at upper side support ends, the basket front has a pair of front side supports extending from the pair of upper side support ends to the front edge of the base panel at an acute angle in relation to the upper side support ends; and
the basket portion further has one or more intermediate dividers positioned between the basket sides, the intermediate dividers extend from the backing panel towards the basket front and divide the basket retaining space into a plurality of compartments, each compartment is adapted to receive and retain the container.

* * * * *